UNITED STATES PATENT OFFICE.

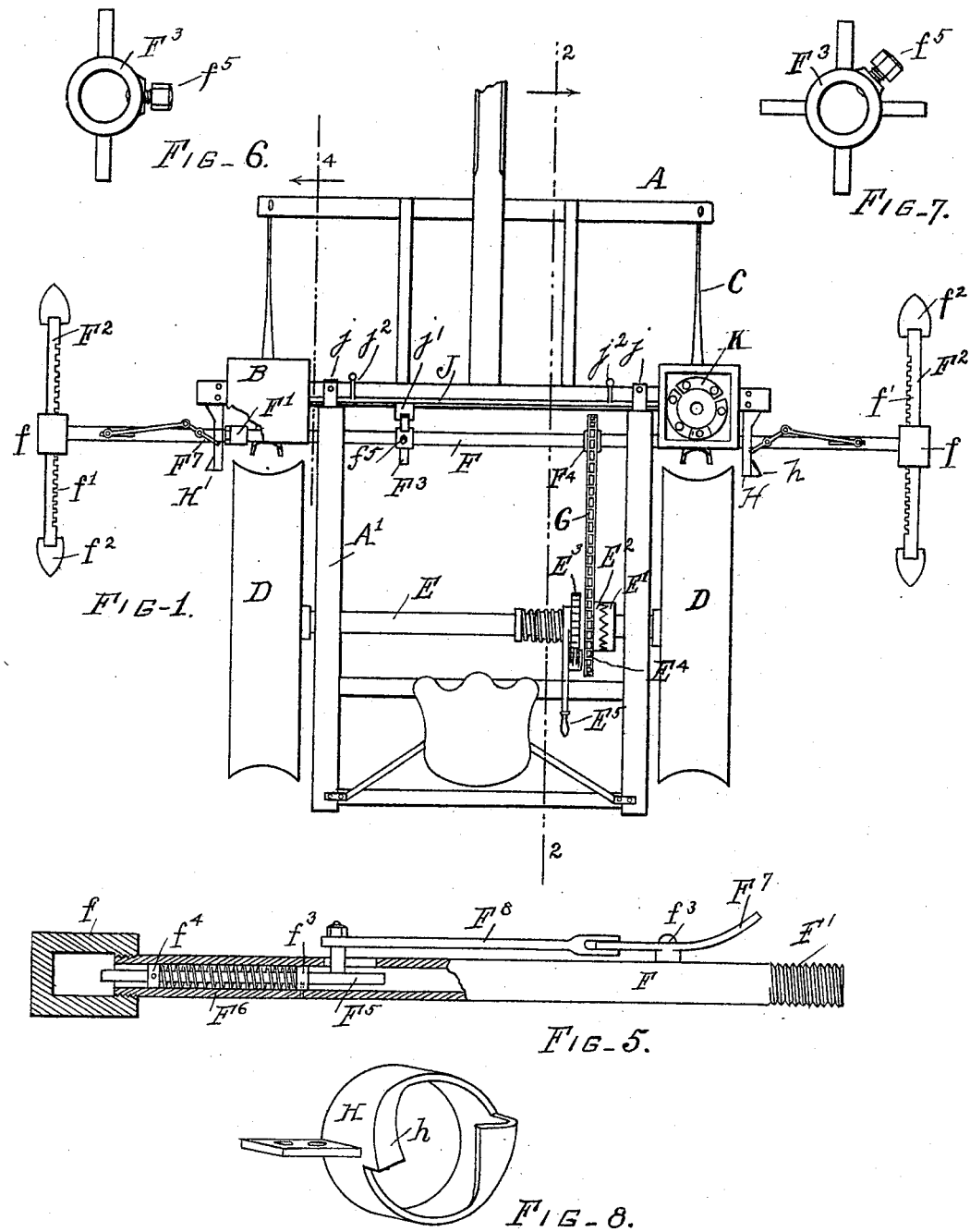

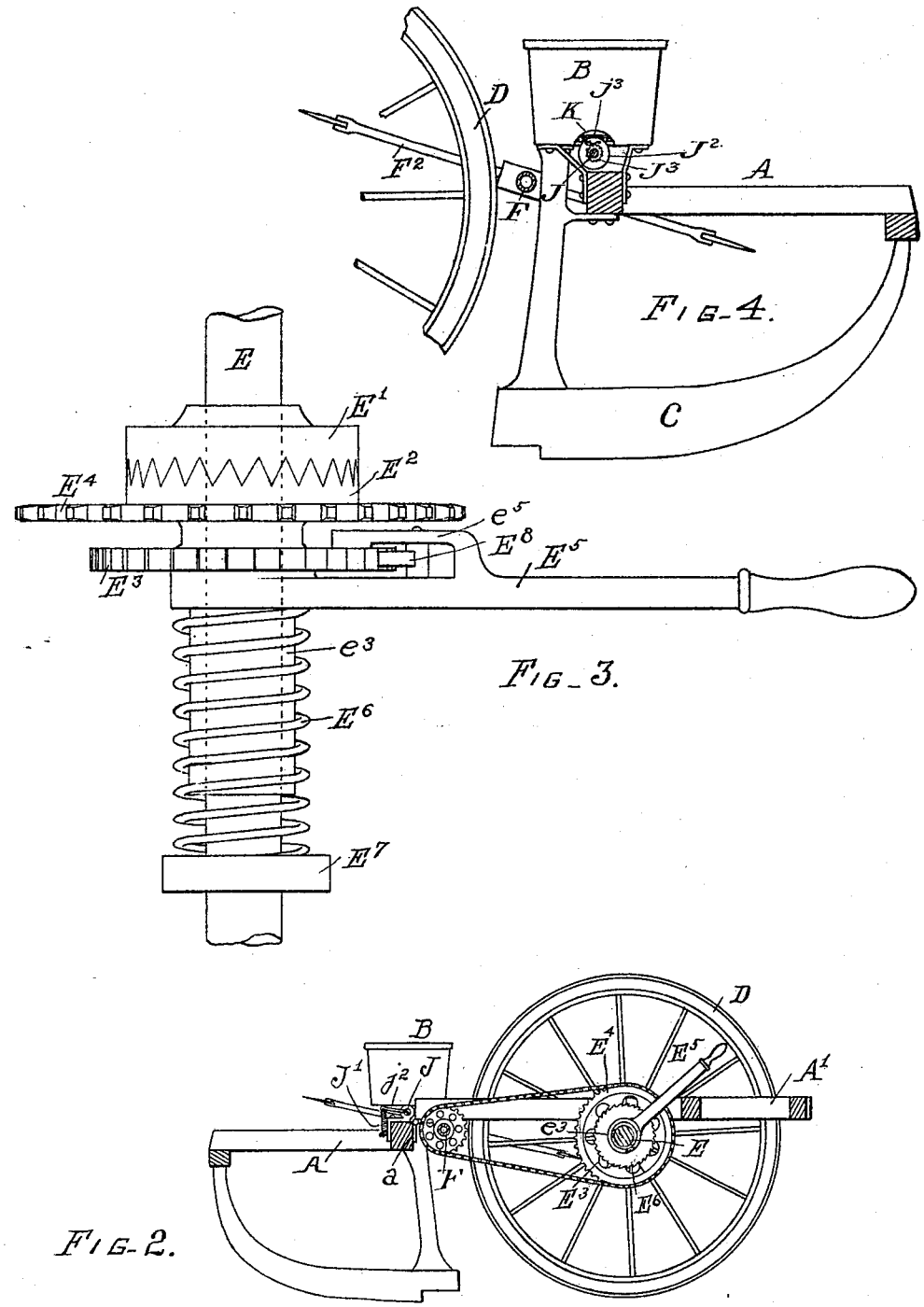

JERRY M. UNDERWOOD AND OTHO N. SPRAGUE, OF PAWNEE, ILLINOIS.

CORN-PLANTER.

SPECIFICATION forming part of Letters Patent No. 619,640, dated February 14, 1899.

Application filed September 7, 1897. Serial No. 650,803. (No model.)

*To all whom it may concern:*

Be it known that we, JERRY M. UNDERWOOD and OTHO N. SPRAGUE, citizens of the United States, residing at Pawnee, in the county of Sangamon and State of Illinois, have invented certain new and useful Improvements in Corn-Planters, of which the following is such a full, clear, and exact description as will enable others skilled in the art to which it appertains to make and use our said invention.

Our invention relates to corn-planters of that class in which the dropper-plates of the corn-planter are automatically operated by mechanism connected with and driven by the main axle of the corn-planter, so as to drop the corn in check-rows without the use of a check rope or wire or other extraneous appliance.

The purposes of our invention are to provide markers of novel and improved form adapted to mark on either side or both sides of the planter as it moves across the field in planting plainly-visible marks running in the direction of travel of the planter at a distance from the nearest row which is being planted equal to one-half of the distance between rows and in line with the corn-rows running transversely to the direction of travel of the planter, said marks being so disposed that when during the operation of planting the marker on one side of the machine—for example, the left-hand marker—has made a row of marks across the field and the machine has been turned around and is returning toward the side of the field whence it started the left-hand marker will retrace step by step the marks which it made in its forward movement across the field, and the right-hand marker will simultaneously make another row of marks which it (the right-hand marker) will retrace step by step when the planter is turned around and again moves forward across the field, and during said second forward movement of the machine across the field the left-hand marker will make another row of marks to be retraced by it as already described, and so on until the field is planted; to provide simple and effective means whereby the markers may be turned forward or backward, so as to cause them to register accurately with the previously-made marks on the ground and so as to cause them to drop into said marks simultaneously with the operation of the dropper-plates of the corn-planter and the dropping of the corn from the seedboxes into the furrows made by the runners in such manner as to insure planting of the corn in accurate check-rows; to provide a corn-planter so constructed and arranged that the mechanism may be conveniently changed so as to adapt the machine to operate either as an automatic check-row planter or as an automatic drill-planter at the pleasure of the operator; to provide means whereby the markers may be retained above the ground during a part of their revolution and may be automatically released, so as to cause the markers to drop and make marks simultaneously with the dropping of the corn into the hills, and to provide a combined clutch and shifting device so constructed and arranged that a single lever may serve to slide the movable member of the clutch, so as to disengage the clutch and temporarily stop the rotation of the marker-shaft when it is traveling too fast for the markers to register with the previously-made marks on the ground and may also serve to give an accelerated partial rotation to the marker-shaft, so as to cause the markers to catch up when the marker-shaft is traveling too slowly for the markers to register with the previously-made marks on the ground.

With these ends in view our invention consists of certain novel features of construction and combinations of parts shown in the annexed drawings, to which reference is hereby made, and hereinafter particularly described, and pointed out in the claims.

Referring to the drawings, Figure 1 is a top plan of the complete corn-planter, the cover of the right-hand seedbox being removed so as to show the dropper-plate in the seedbox. Fig. 2 is a vertical longitudinal section on the line 2 of Fig. 1. Fig. 3 is an enlarged detached top plan of the combined clutch and shifting device. Fig. 4 is an enlarged partial vertical section on the line 4 of Fig. 1. Fig. 5 is an enlarged combined top plan and sectional view of part of the marker-shaft. Fig. 6 is an enlarged side elevation of the form of wiper employed when the machine is used as a check-row planter. Fig. 7 is an enlarged side elevation of an alternative form of wiper employed when the machine is used as a drill-planter. Fig. 8 is an enlarged detached perspective view of one of the cam-plates which operate the latch by which the markers are supported on the marker-shaft.

Similar letters of reference designate like parts in all of the views.

The main frame of the corn-planter may be of any usual or suitable form.

For the purpose of illustrating our invention we have shown in the drawings a main frame consisting of a runner-section A, carrying seed-boxes B, within which are rotatable seed-plates K, through which the corn falls and is deposited in the furrows made by the runners C in a manner which is well known and need not be described here, and a wheel-section A', supported on wheels D and flexibly connected with the runner-section by a hinge $a$. Various modifications in the construction of the planter-frame may be made without departing from our invention, it being only essential that the frame shall be of such form as will serve to support the operative parts of the mechanism in the relative positions shown and described.

The wheels D are secured to the axle or shaft E, and the axle turns in suitable bearings (not shown) on the frame A'.

The clutch member E' is secured to the shaft E, and the complemental clutch member $E^2$ slides and turns on the shaft E.

A ratchet-wheel $E^3$ and a sprocket-wheel $E^4$ are integral with the member $E^2$. A lever $E^5$ has an elongated hub $e^3$, which turns and slides on the shaft E.

A coiled spring $E^6$ surrounds the hub $e^3$, and one end of the spring abuts against the lever $E^5$ and its other end abuts against the collar $E^7$, which is secured to the shaft E. The lever $E^5$ has a prong $e^5$, forming with the body of the lever a fork in which the sprocket-wheel $E^3$ fits.

A pawl $E^8$ in the fork of the lever $E^5$ engages with the ratchet-teeth on the wheel $E^3$.

From the foregoing it will be seen that by pulling the lever $E^5$ to the left the lever, the ratchet-wheel, the sprocket-wheel, and the member $E^2$ will all be moved away from the member E', thereby disengaging the clutch and compressing the spring $E^6$, and when the lever is released the spring will react to close the clutch. It will also be seen that when the clutch is disengaged an intermittent forward rotary motion may be given to the ratchet-wheel $E^3$ and the sprocket-wheel $E^4$ by alternately pushing forward and pulling backward the lever $E^5$. The purpose of these movements will be hereinafter more fully explained.

The marker-shaft F, which is hollow and is preferably made of gas-pipe, turns in suitable bearings (not shown) on the frame A' and is made in three sections—viz., a middle section and two end sections, which are detachably connected with the middle section by screw-couplings F'. When the machine is used as a drill-planter, as hereinafter described, the end sections are detached, as in that case it is not necessary to use the markers.

Each of the end sections of the shaft F has at its outer end a box-shaped guide $f$, in which a marker $F^2$ slides. There are two of these markers, one at each end of the shaft. The markers $F^2$ consist of square rods fitting loosely in the guides $f$ and having in one of their sides a series of notches $f'$, adapted to receive a latch which serves to support the rod, as hereinafter explained, also having at its ends spades $f^2$, which alternately serve to dig holes in the ground as the machine moves across the field, as hereinafter explained.

When the machine is used as a check-row planter, a wiper $F^3$, having two arms, as clearly shown in Fig. 6, is adjustably connected with and turns with the shaft F. The wiper is made adjustable on the shaft in order that it may be set to strike at the precise time required. For connecting the wiper with the shaft we prefer to use a set-screw $f^5$; but any other suitable means may be used.

When the machine is used as a drill-planter, a wiper having a greater number of arms adapted to increase the frequency of the strokes is connected with and turns with the shaft. For this purpose we prefer to use a wiper having four arms, as shown in Fig. 7; but the number of arms may be varied to suit the circumstances. A sprocket-wheel $F^4$ is secured to the shaft F. The sprocket-wheels $E^4$ and $F^4$ are of such relative diameters that when a two-armed wiper is used the machine will drop the corn at intervals equal to the distance between the runners. A sprocket-chain G connects the wheels $E^4$ and $F^4$, and the former drives the latter.

Within the shaft F is a stop $f^3$, having a central hole through which the latch-rod $F^5$ slides freely. A collar $f^4$, secured to the rod $F^5$, fits and slides in the bore of the shaft F. A coiled spring $F^6$ surrounds the rod $F^5$ between the stop $f^3$ and the collar $f^4$. When the rod $F^5$ is pulled inward, the collar $f^4$ acts against and compresses the spring, and when the pull on the rod is released the spring reacts to push the rod outward. When the rod $F^5$ is pushed outward, the outer end of the rod enters one of the notches $f'$ in the marker $F^2$ and serves to support the marker, and when the rod is withdrawn the marker is released and falls to the ground with sufficient force to cause the spades $f^2$ to enter the ground and make a mark, which may easily be seen by the operator. A bent lever $F^7$ has its fulcrum $f^3$ on the shaft F. A connecting-rod $F^8$ connects the rod $F^5$ with the lever $F^7$ in such manner that when the lever is moved by engagement with the cams $h$ on the cam-plate H it will pull on the rod $F^5$ to move the rod inward and compress the spring $F^6$, and when the spring reacts it will move the rod $F^5$ outward and cause the lever $F^7$ to return into position to again engage with the cams on the cam-plate H. The cam-plates H, the form of which is clearly shown in Fig. 8, may be secured to the frame in any suitable manner. There are two of these cam-plates, one on each side of the machine, and each of the cam-plates has two integral cams $h$, with each of which the lever $F^7$ engages at each revolution of the shaft F, so as to withdraw the latch-rod $F^5$ twice and permit the markers to fall twice during each revolution of the shaft F.

For the purpose of operating the dropping devices of the planter we preferably employ the mechanism which we will now describe. A horizontal shaft J turns in suitable bearings $j$ on the frame A. A rearwardly-projecting lug $j'$ and a forwardly-projecting arm $j^2$ are secured to the shaft J. The outer end of the arm $j^2$ is connected with the upper end of a coiled spring J', the lower end of the spring being secured to the frame A in any suitable manner. As the marker-shaft F rotates the arms of the wiper $F^3$ engage with the lug $j'$ on the shaft J and push the lug downward, so as to cause a partial rearward rotation of the shaft J and also cause the arm $j^2$ to pull on the spring J' and when the arms of the wiper are disengaged from the lug $j'$ the spring reacts, so as to cause a partial forward rotation of the shaft J. It will be seen then that a rocking motion is imparted to the shaft J by the alternate action of the wiper and the springs. Two bevel cog-pinions $J^2$ are loose on the shaft J, one near each end thereof, and mesh with bevel cog-teeth on the under side of the dropper-plates K. Ratchet-wheels $J^3$ are secured to the shaft J contiguous to the pinions $J^2$. Pawls $j^3$ on the pinions $J^2$ engage with the ratchet-teeth on the wheels $J^3$. When the shaft J is rocked rearward, the pawls $j^3$ being in engagement with the teeth on the wheels $J^3$, the pinion $J^2$ also turns rearward sufficiently to move the dropper-plates K one step and permit sufficient corn for one hill to drop through the holes in the dropper-plate into the furrow made by the runners. When the spring J' reacts to rock the shaft J forward, the ratchet-wheels $J^3$ turn away from the pawls $j^3$, leaving the pinions $J^2$ and the intermeshing seed-plates at rest. It will be seen then that the rocking movement of the shaft J serves to give an intermittent rotary motion to the seed-plates.

We do not restrict our claims to the precise form of dropper-plates which we have shown and described, nor do we restrict our claims to the precise means herein set forth for converting the rocking motion of the shaft J into intermittent rotary motion of the dropper-plates K.

It is obvious that dropper-plates of other and different forms may be used and other and different means for converting the rocking motion of the shaft into rotary motion of the dropper-plates may be used without departing from our invention, it being only essential that suitable means shall be provided for converting the rocking motion of the shaft into rotary motion of the dropper-plates.

The cam-plates H, the wiper $F^3$, and the lug $j'$ are so placed on the frame A, the marker-shaft F, and the rock-shaft J, respectively, that when during the revolution of the shaft F the wiper $F^3$ comes into engagement with the lug $j'$ the markers $F^2$ will be in a vertical position in the guides $f$ and the levers $F^7$ will be in engagement with the cams $h$ on the cam-plates, to the end that the latches may release the markers and the markers may drop at the same instant that the rock-shaft operates the dropper-plates and the corn falls through the holes in the dropper-plates into the furrows. Immediately after the dropping of the markers $F^2$ the levers $F^7$ cease to engage with the cams $h$ and the spring $F^6$ reacts to push the latch $F^5$ into the notches $f'$ in the markers $F^2$, thus locking the markers and preventing them from being pushed upward through the guides $f$. The shaft F turns continually, and the markers turn with it. As the markers are turned upward by the revolution of the shaft the spades $f^2$ on the lower ends of the markers scoop out the dirt, so as to leave a plainly-visible mark directly in line with every hill of corn that is dropped. These marks serve as a test of the accuracy of the check-rows in which the corn is dropped, as we will now explain. For example, let it be assumed that the machine has made one trip forward across the field, making a row of marks as it went, and that it is desired to know if the machine is dropping the corn in accurate check-rows in going back across the field. If the corn is being dropped in accurate check-rows as the machine goes back, the markers will retrace step by step the marks which they made as the machine went forward, and if they do not so retrace said marks it will be known that the machine is not dropping the corn in accurate check-rows. If in going back the markers enter the ground and make marks before reaching the previously-made marks, the planter is dropping ahead of time, and in that case the clutch on the shaft must be disengaged so as to stop the rotation of the marker-shaft long enough to permit the markers to remain at rest while the machine moves forward a distance equal to the distance between the last made and the previously-made marks. When this has been done, the clutch is again engaged and the markers will then retrace the previously-made marks. If the markers pass the previously-made marks before making new marks, it will be known that the machine is dropping too late to check with the previously-dropped rows. In that case the lever $E^5$ will be slid inward and pushed quickly forward, thereby turning the sprocket-wheel $E^4$ so as to accelerate the rotation of the shaft F to such extent as to cause the markers to drop at the instant when they come directly over the previously-made marks, and the markers will then continue to retrace the previously-made marks so long as the machine continues to drop in accurate check-rows.

In order to use the machine as a drill-planter, the two-armed wiper is removed and the four-armed wiper is substituted therefor. The detachable ends of the marker-shaft carrying the markers are also unscrewed and detached, as it is unnecessary to use the markers when planting in drills.

Having fully described our invention, what we claim as new, and desire to secure by Letters Patent, is—

1. In a corn-planter the combination of a marker-shaft consisting of a central section and detachable end sections, a main frame on which said marker-shaft is supported and turns, means for rotating said marker-shaft, a wiper connected with the central section of the marker-shaft, dropper-actuating mechanism engaged and operated by said wiper, cam-plates secured to the main frame, guides at the outer ends of the detachable sections of the marker-shaft, notched markers slidable in said guides, latches slidable in said detachable sections of the marker-shaft and adapted to enter notches in the markers, springs acting against said latches, levers fulcrumed on said end sections of the marker-shaft and adapted to engage with the cams on the main frame, and rods connecting said levers with said latches, substantially as set forth.

2. In a corn-planter, the combination of a main frame; a main axle and a marker-shaft supported and turning on said main frame; a slidable clutch, a sprocket-wheel and a ratchet-wheel on said axle; a sprocket-wheel and a wiper on said marker-shaft; guides on said marker-shaft; notched markers slidable in said guides; a sprocket-chain connecting the sprocket-wheel on the main axle with the sprocket-wheel on the marker-shaft; cam-plates on the main frame coaxial with the marker-shaft and having double cams; slidable latches on said marker-shaft adapted to enter the notches in said markers; springs acting against said latches; levers fulcrumed on said marker-shaft and adapted to engage with the cams on said cam-plates; rods connecting said levers with said latches; a rock-shaft on the main frame having a lug with which the wiper on the marker-shaft engages to oscillate said rock-shaft rearward; springs reacting against said rock-shaft to oscillate it forward; bevel cog-pinions loose on said rock-shaft; ratchet-wheels secured to said rock-shaft; pawls on said cog-pinions engaging with the ratchets on said rock-shaft; and toothed dropper-plates meshing with and driven by said cog-pinions; as set forth.

3. In a corn-planter, the combination of a main frame; an axle and a marker-shaft supported to turn thereon; a slidable clutch, a sprocket-wheel and a ratchet-wheel on said axle; a sprocket-wheel, a wiper and guides on said marker-shaft; a sprocket-chain connecting the sprocket-wheels on said axle and said marker-shaft, cam-plates secured to the main frame and provided with cams, notched markers slidable in said guides, latches carried on said marker-shaft and adapted to engage with said markers, and actuated by the cams on said cam-plates, and dropper mechanism on the main frame adapted to be operated by said wiper, as set forth.

4. A marker-shaft consisting of a central section and two end sections detachably connected therewith, a wiper on the central section of said shaft, guides and latches on the end sections of said shaft, and markers sliding in said guides and having notches which said latches enter; in combination with a main frame on which said shaft is supported, means for rotating said shaft, means adapted to operate said latches, corn-dropping mechanism on the main frame, and a rock-shaft adapted to intermittently operate said corn-dropping mechanism, said rock-shaft being operated by the wiper on said marker-shaft, as set forth.

5. In a corn-planter the combination of a main frame, a main axle and a marker-shaft supported and turning on said main frame, a clutch member secured to said axle, an integral clutch member sprocket-wheel and ratchet-wheel loose on said axle, a lever engaging with said ratchet-wheel, a spring acting against said lever; a sprocket-wheel on said marker-shaft, a sprocket-chain connecting the sprocket-wheel on the marker-shaft with the sprocket-wheel on the main axle, gravitating markers on said marker-shaft, means for automatically engaging and disengaging said gravitating markers; corn-dropping mechanism on the main frame and means for operating said corn-dropping mechanism simultaneously with the disengagement of said markers, substantially as set forth.

In witness whereof we have hereunto subscribed our names, in the presence of two witnesses, at Pawnee, Sangamon county, Illinois, this 17th day of August, A. D. 1897.

JERRY M. UNDERWOOD.
OTHO N. SPRAGUE.

Witnesses:
W. R. GALYEN,
CALVIN SANDERS.